United States Patent Office 3,017,245
Patented Jan. 16, 1962

3,017,245
REMOVAL OF SODIUM SULFATE FROM
CAUSTIC SALT
Robert D. Goodenough, Midland, Mich., assignor to The
Dow Chemical Company, Midland, Mich., a corporation of Delaware
No Drawing. Filed Jan. 14, 1960, Ser. No. 2,350
4 Claims. (Cl. 23—89)

This invention relates to a process for removing sodium sulfate from caustic salt.

In the electrolytic production of caustic soda, a sodium chloride brine is subjected to electrolysis whereby a minor portion of the sodium chloride is converted to sodium hydroxide. The dilute caustic solution thus obtained is generally concentrated by evaporation. Upon evaporation, the sodium chloride in the brine which had not electrolyzed crystallizes out and is often referred to as "caustic salt" in the trade. It is generally desirable to recover the sodium chloride in the caustic salt and reuse it by dissolving it in water, to produce additional brine, or in a brine to saturate it prior to passing the brine through the electrolytic cell. Some difficulties are encountered in trying to use this caustic salt. Upon crystallization of the sodium chloride, during the concentration of caustic, the sodium sulfate present in the brine is carried down with the caustic salt. Thus, when the caustic salt is redissolved and used as a feed brine, the sodium sulfate concentration increases and the efficiency of the electrolytic cell is substantially decreased. Further, difficulty is also obtained in fouling of the evaporators and in decreasing the rate of filtration of the caustic in the separation from the caustic salt. Numerous methods have been proposed for the separation of the sodium sulfate from crystallized sodium chloride. Separation by flotation and by fractional crystallization have been suggested, but these methods are relatively difficult and expensive. Attempts to dissolve the sodium sulfate from the caustic salt has also proved unsatisfactory due to the high percentage of sodium chloride which also dissolves and is then lost, since it cannot be recycled in the process.

It is therefore an object of this invention to provide a process for the removal of sodium sulfate from sodium chloride contaminated with sodium sulfate, e.g. caustic salt. A further object is to provide a method for separating sodium sulfate from sodium chloride contaminated with sodium sulfate in which only a small amount of the sodium chloride is lost with the sodium sulfate.

The above and other objects are attained according to the invention by contacting the caustic salt with an aqueous sulfuric acid solution having from 12 to 65 weight percent of sulfuric acid. The sodium sulfate in the caustic salt reacts with the sulfuric acid to form sodium bisulfate which is soluble in the acid solution. When a sulfuric acid of the above concentration is used, the sodium sulfate in the caustic salt may thus be selectively removed from sodium chloride. By this process it is possible to remove over 80 percent of the sodium sulfate from the caustic salt with a relatively small loss of sodium chloride.

Upon evaporation of the caustic solution coming from the electrolytic cells, the caustic salt crystallizes out. Thus, the caustic salt is in the form of somewhat varied size crystals as would be normally expected in a crystallization process and may contain from 3 up to as high as about 30 weight percent of sodium sulfate depending on the concentration of sodium hydroxide solution evaporated and the evaporation temperature. In addition to the sodium sulfate, some caustic soda may also be occluded. The salt may contain from about 0.1 up to about 30 weight percent of sodium hydroxide. While the crystal size may vary from fine particles barely recoverable by mechanical separation means, such as filtration, up to crystals of a size which will just pass through a 60 mesh Tyler standard screen, these crystals may be treated with the acid solution without further processing. The caustic salt obtained may be simply mixed with the sulfuric acid solution for a short period of time, such as 10 or 15 minutes, and then the mixture filtered to separate the undissolved salt. However, it may be more convenient at times to place the caustic salt as obtained after filtration in a column or bed and pass the sulfuric acid through the bed. If desired, a continuous countercurrent operation may be used employing the usual solid-liquid contact equipment. Room temperatures are generally employed, although a temperature in the range of 0 to 125° C. may be used. Usually, the advantage gained by either cooling or heating the mixture is not sufficient to offset the additional cost of changing the temperature.

While an aqueous acid solution having from 12 to 65 weight percent of sulfuric acid may be used, it is preferred to use a solution having from 25 to 50 weight percent acid. When an acid solution more concentrated than 65 weight percent is used sufficient removal of the sodium sulfate from the caustic salt is not obtained. With a too dilute acid solution an appreciable amount of the sodium chloride is lost by dissolving in the solution. A stoichiometric amount of sulfuric acid to react with the sodium sulfate present in the caustic salt, after the neutralization of the occluded caustic soda, is generally employed. A slight excess may be preferred at times. When the more concentrated acid solutions are used, it may be advantageous to use a stoichiometric excess of from 10 to 20 percent or even as high as 40 percent.

The following examples further illustrate the invention.

EXAMPLE I

A caustic salt containing 9.63 weight percent of sodium sulfate, 0.2 weight percent of sodium hydroxide, 5 weight percent water, and the balance sodium chloride was treated with sulfuric acid solutions to extract the sodium sulfate.

A series of runs was made where the salt was treated with acids of various concentrations. In three of the runs the stoichiometric amount of the acid was used, while in the fourth an excess was employed. In each of the runs, 100 grams of the salt was treated with the acid by intermixing the salt with the acid solution in a flask at room temperature for about 10 minutes. After intermixing the salt with the sulfuric acid solution, the mixture was filtered to recover the remaining salt which after being washed with about 19 millimeters of water was analyzed for its sodium sulfate content.

The pertinent data and results obtained are shown in Table I below.

Table I

| Run No. | Weight of Caustic salt, grams | Weight of salt remaining after acid treatment, grams | Conc. of sulfuric acid solution used, weight percent H$_2$SO$_4$ | Amount of acid used, percent of stoichiometric | Percent of Na$_2$SO$_4$ removed | Weight ratio of Na$_2$SO$_4$ removed to NaCl dissolved |
|---|---|---|---|---|---|---|
| 1 | 100 | 70.7 | 13.5 | 100 | 93.0 | 1:2.0 |
| 2 | 100 | 78.8 | 25 | 100 | 84.8 | 1:1.2 |
| 3 | 100 | 86.6 | 47 | 100 | 74.7 | 1:0.87 |
| 4 | 100 | 82.9 | 47 | 130 | 84.8 | 1:0.93 |

To compare the loss of sodium chloride obtained when water is used to leach out the sodium sulfate, a 100 gram sample of the caustic salt used above was leached for 10 minutes with 71 ml. of water until 69.3 grams of the salt remained. The remaining salt had a sodium sulfate content of 5.03 percent which represents a 63.9 percent removal of sodium sulfate. When calculated on a basis similar to that above, the ratio of sodium sulfate removed to sodium chloride dissolved was 1:4.

EXAMPLE II

A caustic salt containing 23.9 weight percent sodium sulfate, 4.02 weight percent sodium hydroxide, 5 weight percent water and the balance sodium chloride was treated with a sulfuric acid solution. A series of runs was made where the salt was treated with different amounts of a 34.8 weight percent acid solution to show the effects of the different amounts on the extraction of the sodium sulfate. Also a run was made using the above caustic salt with an acid solution containing 47 weight percent acid.

The pertinent data and results obtained are shown in Table II below.

Table II

| Run No. | Weight of Caustic salt, grams | Weight of salt remaining after acid treatment, grams | Conc. of sulfuric acid solution used, weight percent H$_2$SO$_4$ | Amount of acid used, percent of stoichiometric | Percent of Na$_2$SO$_4$ removed | Weight ratio of Na$_2$SO$_4$ removed to NaCl dissolved |
|---|---|---|---|---|---|---|
| 1 | 200 | 182.8 | 34.8 | 50 | 39.5 | 1:0.38 |
| 2 | 200 | 167.5 | 34.8 | 75 | 57.6 | 1:0.34 |
| 3 | 200 | 155.2 | 34.8 | 90 | 65.6 | 1:0.36 |
| 4 | 200 | 147.0 | 34.8 | 100 | 75.6 | 1:0.31 |
| 5 | 200 | 133.2 | 34.8 | 125 | 88.3 | 1:0.36 |
| 6 | 185.3 | 161.2 | 47.0 | 100 | 58.9 | 1:0.23 |

What is claimed is:

1. A process for the removal of sodium sulfate from caustic salt containing sodium sulfate and occluded caustic soda which comprises contacting at a temperature in the range of 0° to 125° C. the caustic salt with an aqueous sulfuric acid solution having from 12 to 65 weight percent of sulfuric acid to convert the sodium sulfate in the caustic salt to sodium bisulfate and to thereby dissolve the sodium bisulfate thus formed in the solution, said caustic salt being contacted with the acid in a stoichiometric amount to react with the sodium sulfate present in the caustic salt after the neutralization of the occluded caustic soda and separating the resulting solution from the remaining undissolved salt.

2. A process according to claim 1 wherein the acid solution contains from 35 to 50 weight percent of sulfuric acid.

3. A process according to claim 2 wherein the caustic salt contains from 3 to 30 weight percent of sodium sulfate.

4. A process according to claim 3 wherein the caustic salt is contacted with from 10 to 20 percent stoichiometric excess of the acid solution.

References Cited in the file of this patent

UNITED STATES PATENTS

| 1,376,671 | Bronnert | May 3, 1921 |
| 1,693,947 | Carothers et al. | Dec. 4, 1928 |
| 2,208,175 | Wilson | July 16, 1940 |
| 2,893,836 | Davis et al. | July 7, 1959 |

FOREIGN PATENTS

| 384,726 | Great Britain | Dec. 15, 1932 |

OTHER REFERENCES

Comey: Dictionary of Chemical Solubilities, page 379 (1896), MacMillan and Co., New York, N.Y.